United States Patent
Lacko et al.

(10) Patent No.: US 7,242,465 B2
(45) Date of Patent: Jul. 10, 2007

(54) DEVICE AND PROCESS FOR QUANTITATIVE ASSESSMENT OF THE ORIENTATION OF TWO MACHINES RELATIVE TO ONE ANOTHER

(75) Inventors: Dragutin Lacko, Schoten (BE); Pascal Locoge, Erding (DE)

(73) Assignee: Prüftechnik Dieter Busch AG, Ismaning (DE)

( * ) Notice: Subject to any disclaimer, the term of this patent is extended or adjusted under 35 U.S.C. 154(b) by 388 days.

(21) Appl. No.: 10/739,408

(22) Filed: Dec. 19, 2003

(65) Prior Publication Data
US 2005/0078321 A1    Apr. 14, 2005

(30) Foreign Application Priority Data
Dec. 19, 2000   (DE) ................................ 102 60 099

(51) Int. Cl.
*G01B 11/26* (2006.01)
(52) U.S. Cl. .................. 356/153; 356/399; 33/412; 33/645
(58) Field of Classification Search ........ 356/153–155, 356/152.3, 400, 399; 33/412, 645, 529
See application file for complete search history.

(56) References Cited

U.S. PATENT DOCUMENTS

| | | | | |
|---|---|---|---|---|
| 4,586,264 A | * | 5/1986 | Zatezalo | 33/412 |
| 4,709,485 A | * | 12/1987 | Bowman | 33/228 |
| 5,026,998 A | * | 6/1991 | Holzl | 250/559.37 |
| 5,077,905 A | * | 1/1992 | Murray, Jr. | 33/412 |
| 6,040,903 A | * | 3/2000 | Lysen et al. | 356/153 |
| 6,434,849 B1 | * | 8/2002 | Hermann | 33/529 |
| 6,968,625 B2 | * | 11/2005 | Segerstrom et al. | 33/286 |

OTHER PUBLICATIONS

FIXTURLASER® Cardan, Cardan Shaft Fixture, P-0195-GB, Jun. 2, 2006, Phamplet, 4 pages.
FIXTURELASER Webpage, Cardan Shaft Fixture, Aug. 2000, 2 pages.

* cited by examiner

*Primary Examiner*—Layla G. Lauchman
(74) *Attorney, Agent, or Firm*—David S. Safran

(57) ABSTRACT

A device for quantitative assessment of the orientation of two machines relative to one another has auxiliary devices in the form of extenders or holding devices (40, 50) on which displacement and/or mounting of light transmitting or receiving devices (44, 52) are mountable in a manner that makes the use of a precision pivot bearing unnecessary.

3 Claims, 2 Drawing Sheets

DEVICE AND PROCESS FOR QUANTITATIVE ASSESSMENT OF THE ORIENTATION OF TWO MACHINES RELATIVE TO ONE ANOTHER

BACKGROUND OF THE INVENTION

Field of the Invention

The invention relates to a device and the corresponding process for quantitative assessment of the orientation of two machines or machine parts relative to one another which are connected by a cardan shaft with two universal joints.

A device of this type is known and is shown in FIG. 1. Such a device requires a precise and relatively costly rotary joint 22 in order to keep a means 24 for sending and receiving a measurement light beam 28 from a source at distance from the machine shaft 10 which is to be measured. For this purpose, for example, an extender rail 20 and clamp devices 16 are used in addition.

SUMMARY OF THE INVENTION

A primary object of this invention is to devise a device that is comparable comparable to the known device but which is clearly more economical and does not adversely affect the ease of operation.

DETAILED DESCRIPTION OF THE INVENTION

The invention is based on the finding that it is often necessary, in practice, to determine the parallel axial offset of machines which are structurally connected by a cardan shaft with two universal joints. Generally, a cardan shaft is used when there is, in principle, a parallel axial offset and knowing the absolute magnitude of the offset is not critical. However, for reasons of rotational kinematics, it is especially important that the axes of the shafts of the machines which have been coupled to one another in this way are, for the most part, parallel in order to avoid even the smallest variations of angular accelerations on the rotating machine elements. Accordingly, in accordance with the invention, it is not necessary to provide a measurement system which, at the same time, can detect the parallel and angular offset of shafts. Rather, it is sufficient to provide a measurement system which can detect simply the angular offset of these shafts in a precise manner. With consideration of certain geometrical boundary conditions and relationships, it is thus possible to devise a measurement device and a process in which a conventional measurement rotary joint can be completely eliminated. Conclusions regarding the angular misalignment of these shafts and the corresponding machines can be drawn from the detectable amounts of offset which are detected in different rotary positions of the shafts which are to be measured by means of conventional sensors using simple formulas.

Figure 1:
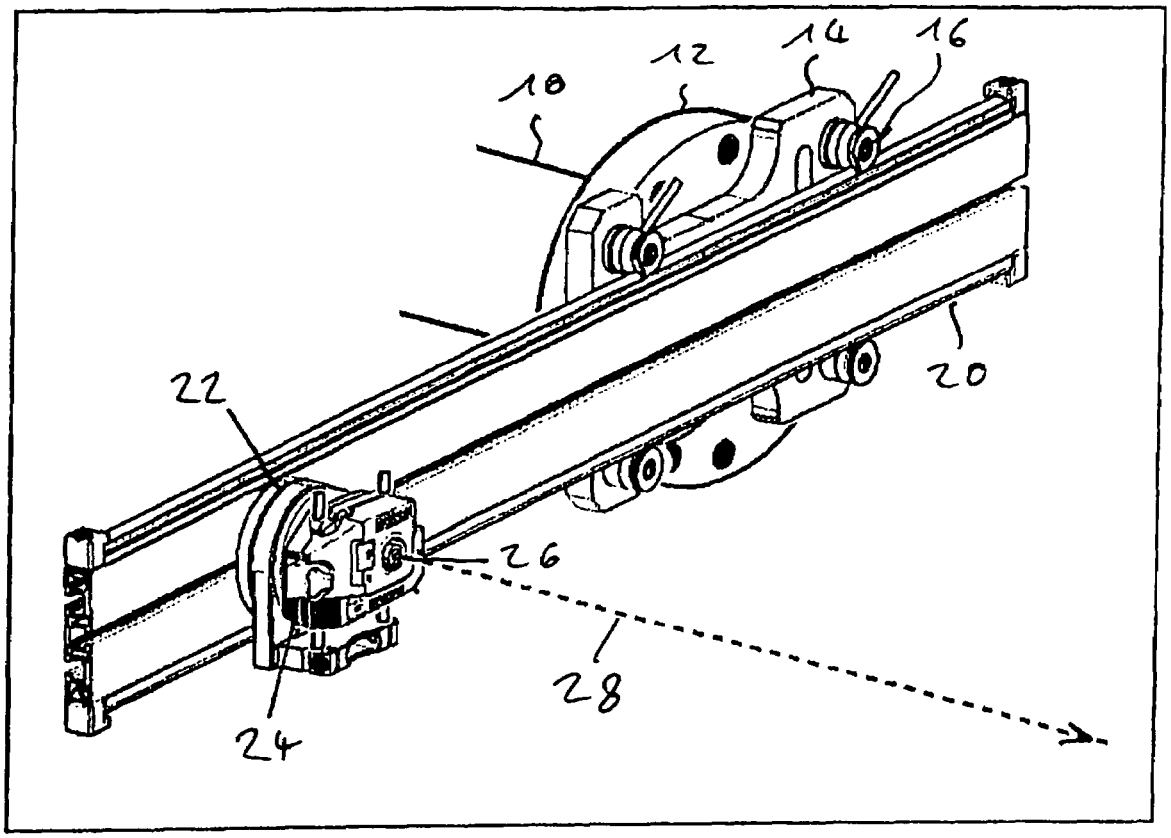
FIG. 1 is perspective view of a known device.
Figure 2:
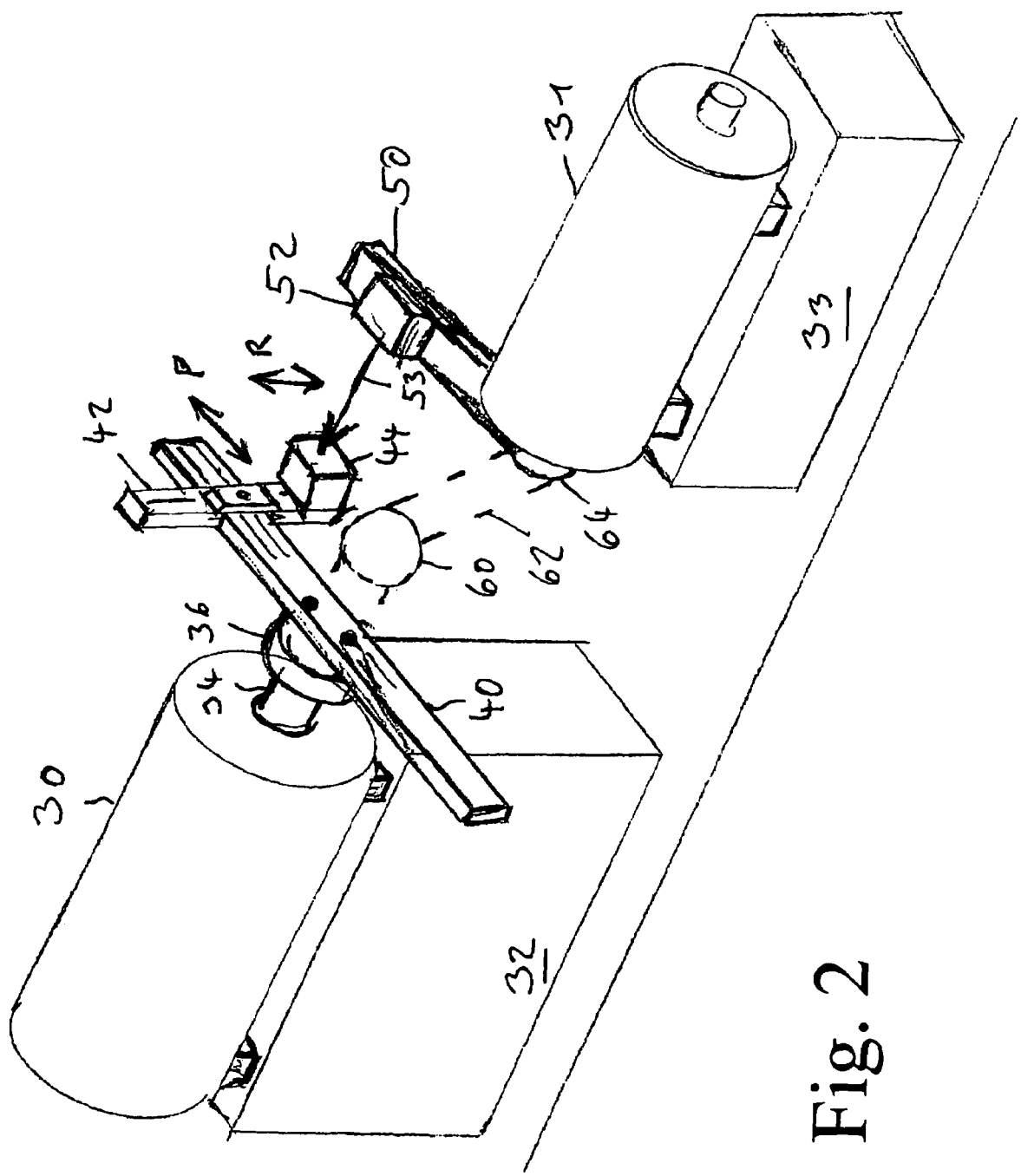
FIG. 2 is a perspective view showing alignment being performed with a device in accordance with the present invention.

Details of the invention are shown in FIG. 2. There, a cardan shaft 62 and universal joints 60, 64 are assumed to have been already removed for the measurement and therefore are schematically shown only by a broken line. As is apparent from the figure, the machines 30, 31 may stand on bases 32, 33 of different heights and thus have a parallel offset of their shafts. The extender 40 can be attached conventionally or by means of screws to the coupling support 36 and can carry an extra extender 42; but this is optional. In any case, either a light transmitter and/or receiver is mounted either directly on the extender directly or indirectly by means of the extra extender 42. In this example, a receiving module 44 as is known in the prior art.

In the illustrated measurement position, which is also called the "3 o'clock position," the receiving module can determine the incidence site of the incident light beam 53 which is emitted by a light transmitter 52. The light transmitter 52 is mounted on a second extender or a holding device 50 which is likewise mounted on the corresponding coupling support of the machine 31. The measurement is taken such that the receiving module is operated in the conventional manner in one mode and that it allows determination of the incidence direction of an incident light beam by means of two photosensitive plates.

In accordance with the invention, it is simplest to turn the extender by 180° to determine the measurement quantities of interest (therefore, to set, for example. the "9 o'clock position"), to move the corresponding module 44 such that it can also be hit by the light beam 53 in this position, and to take an additional measurement using the light transmitter and the receiving module in this position. (If the functions of the light transmitter and of the receiving module are combined in a single housing, it is also possible, in accordance with the invention, to provide this combination in interplay with a plane mirror, especially a large-area planar mirror). In this position, the two photosensitive plates of the receiving module thus see one direction of incidence of the light beam which, when the machines 30, 31 are not aligned parallel, is distinguished from the direction of incidence in the "3 o'clock" position according to two detectable angle coordinates. Therefore, only the respective directions of incidence are measured and the position of the incident light beam is of subordinate importance in accordance with the invention. For this reason, it is therefore also possible and uncritical to move the light receiving or transmitting module (44, optionally 52, or both at the same time) relative to one another on the extender or extenders, and then, to fix it briefly thereon for an individual measurement.

In principle, the invention makes do without the extra extender 42 if measurement positions can be set which lie rotated roughly 180° apart. If this is not the case, the extra extender 42 should be used, and instead of simply structured determination equations for determining the relative position of the machines, then ones should be used which take into account the corresponding projections (therefore the sine and cosine portions) of the angle of rotation of the extenders which differs from 180°.

It is advantageous to take three or more measurements in additional measurement positions, i.e., rotational positions of the extenders and to combine them using statistical considerations or compensation computations into a more accurate measurement result than is possible with only two measurements.

In another advantageous embodiment of the invention, it is provided that the extenders 40 and/or 50 be equipped with compensation weights (not shown) such that the torques applied to the shafts or mountings can be kept as small as possible. In this way, detection of the measurement values is facilitated, especially for smoothly running shafts.

What is claimed is:

1. Device for quantitative assessment of the relative orientation of two machines which have shafts that are rotatable about axes that are parallel and offset in a radial direction relative to one another, comprising:

auxiliary devices in the form of extenders on which at least one of light transmitting and receiving devices is mountable without a precision pivot bearing, said auxiliary devices having a coupling means for coupling each of the auxiliary devices to an end of the shaft of a respective one of the two machines so as to rotate with rotation of the shaft, and wherein at least one of the auxiliary devices has a means for enabling linear adjustment and fixing of the position of the one of the at least one of the light transmitting and receiving devices on the respective auxiliary device so that the light transmitting and receiving devices on the extenders are alignable in multiple rotational positions of the shafts.

2. Process for quantitative assessment of the relative orientation of two machines which have shafts that are rotatable about axes that are parallel and offset in a radial direction relative to one another, comprising the steps of:

first, determining a first direction of incidence of a measurement light beam in a first measurement position of auxiliary devices in the form of extenders or holding devices on which at least one of light transmitting and receiving devices is mounted without a precision pivot bearing, second, rotating the auxiliary devices by rotating said shafts about said axes and determining a second direction of incidence of the measurement light beam in a resultant second measurement position of the auxiliary devices, and drawing a conclusion regarding misalignment of the machines from a difference of the incidence directions of the measurement light beam in the two measurement positions.

3. Device according to claim 1, wherein said extender is a first extender and is fixed to said at least one of the shafts and said means for enabling linear adjustment and fixing of the position of the one of the at least one of the light transmitting and receiving devices comprises a second extender which is connected to said first extender so as to be positionally adjustable in directions parallel to and transverse to the length of the first extender and to which the at least one of the light transmitting and receiving devices is connected.

* * * * *